W. H. HOWARD.
MODE OF SERRATING ROLLERS.
No. 27,129.          Patented Feb. 14, 1860.
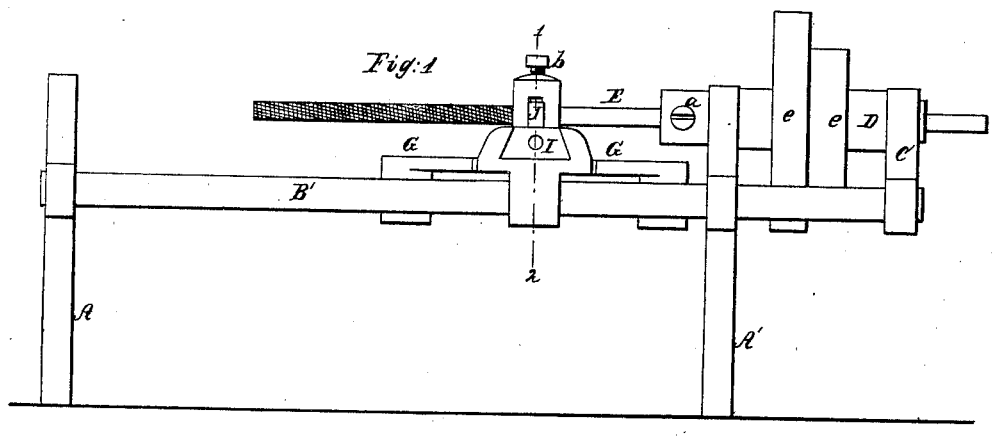
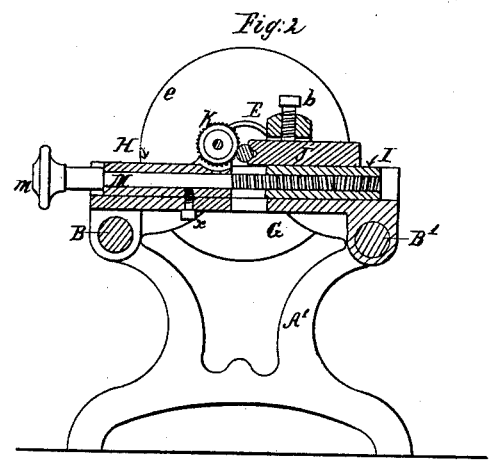
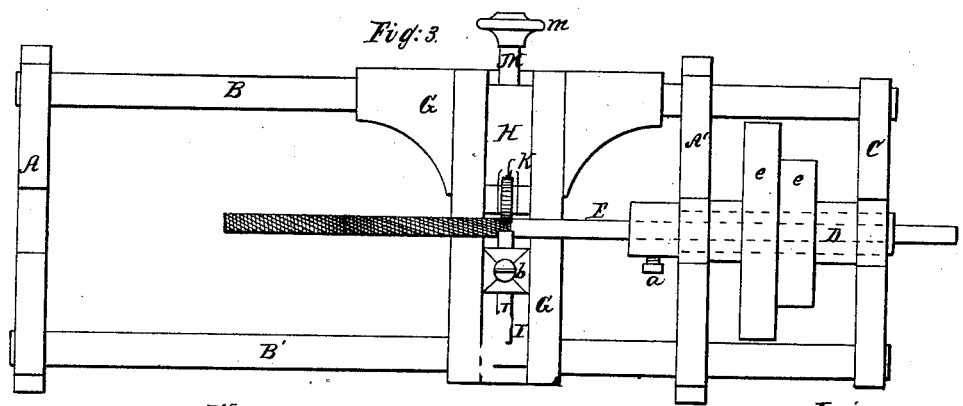
Witnesses
Horace See
Inventor
Wm. H. Howard

UNITED STATES PATENT OFFICE.

WILLIAM H. HOWARD, OF PHILADELPHIA, PENNSYLVANIA.

MACHINE FOR SERRATING THE EDGE OF A SCREW-THREAD ON ROLLERS.

Specification of Letters Patent No. 27,129, dated February 14, 1860.

*To all whom it may concern:*

Be it known that I, WILLIAM H. HOWARD, of the city and county of Philadelphia and State of Pennsylvania, have invented a new and Improved Mode of Serrating the Surfaces of Metal Bars or Rollers; and I do hereby declare the following to be a full, clear, and exact description of the same, reference being had to the accompanying drawing and the letters of reference marked thereon.

My invention relates to a mode of rapidly and accurately serrating the surfaces of rollers to be used in connection with temples for looms, and for other purposes, and my invention consists in serrating the surfaces of such rollers by means of a screw cutting die and a milling roller arranged in respect to and operating simultaneously on the roller to be serrated substantially as described hereafter.

In order to enable others skilled in the art to practice my invention, I will now proceed to describe the manner in which I carry it into effect.

On reference to the accompanying drawing which forms a part of this specification, Figure 1, is a side view of my improved machine for serrating the surfaces of rollers. Fig. 2, a transverse sectional elevation on the line 1—2 Fig. 1 and Fig. 3, a ground plan.

Similar letters refer to similar parts throughout the several views.

B and B′ are two round guide bars secured to the standards A and A′, and to the cross piece C. In the latter and in the standard A′ turns a hollow spindle D through which passes the rod or roller E to be operated on, the said roller being secured to a spindle by a set screw *a* and the spindle being furnished with any convenient number of different sized pulleys *e* for receiving a driving strap from any adjacent shaft.

G is a plate arranged to fit snugly but so as to slide freely on the guide bars B and B′, and on this plate is formed a dovetailed groove for receiving the dovetailed slides H and I, the said groove being situated at right angles to the center line of rotation of the hollow spindle D.

A steel die J is secured to the slide *i* by means of a screw *b* the end of the die being hollowed and threads of a screw being cut in its hollow end which is adapted to the position and diameter of the bar or roller E, so as to operate on the latter precisely in the same manner as the dies of a screw cutting machine.

To the slide H is hung a hardened steel milling roller K, on the periphery of which are transverse sharp edged projections.

A spindle M passes freely through the slide H and screws into the slide I, the outer end of the spindle being furnished with a suitable enlargement or handle *m*.

The roller or rod E being inserted into the hollow spindle D and secured to the same by the set screw *a*, the plate G with its appendages, is moved to such a position that the milling roller K and screw cutting die J, shall be near the end of the rod or roller E. The slide H is then adjusted to such a position that its milling roller K shall bear with the required force against one side of the roller E, the slide being secured to its proper position after adjustment by a set screw *x*.

The slide *i* is then adjusted by turning the spindle M to such a position that the hollowed cutting end of the die J shall bear against the side of the roller E opposite to that against which the milling roller bears. A rotary motion is now imparted to the hollow spindle D and the rod or roller E, when the die J will form the threads of a screw on the surface of the roller and will cause the plate G and its appendages to transverse the guide bars B and B′.

While the die is acting on one side of the roller the transverse sharp edged projections on the milling roller K are indenting the threads of the screw formed by the die, and thus the whole surface of the roller is serrated.

When the serrated roller has to be used in connection with temples for looms, one portion has a left handed serrated screw thread cut on its surface and on the other portion a right handed thread. To accomplish this by the above described machine, all that is necessary is to change the die, which must have a right handed thread when one portion of the roller is acted on, and a left handed cutting thread to act on the other portion of the roller.

I claim as my invention and desire to secure by Letters Patent—

Serrating the surfaces of metal bars or rollers by means of a screw cutting die J and a milling roller K arranged in respect to and operating simultaneously on the said bar substantially as herein set forth.

In testimony whereof, I have signed my name to this specification, in the presence of two subscribing witnesses.

WM. H. HOWARD.

Witnesses:
HENRY HOWZA,
CHARLES D. FREEMAN.